(12) United States Patent
Miller et al.

(10) Patent No.: US 10,217,049 B2
(45) Date of Patent: **\*Feb. 26, 2019**

(54) SYSTEMS AND METHODS FOR DETERMINING SOCIAL PERCEPTION

(71) Applicant: SMART INFORMATION FLOW TECHNOLOGIES LLC, Minneapolis, MN (US)

(72) Inventors: Christopher A. Miller, St. Paul, MN (US); Peggy Wu, Ellicott City, MD (US); Jeffrey M. Rye, Minneapolis, MN (US); Harry B. Funk, Minneapolis, MN (US); Tammy Elizabeth Ott, Hilbert, WI (US); Sonja Maria Schmer-Galunder, Basel (CH)

(73) Assignee: SMART INFORMATION FLOW TECHNOLOGIES, LLC, Minneapolis, MN (US)

( * ) Notice: Subject to any disclaimer, the term of this patent is extended or adjusted under 35 U.S.C. 154(b) by 842 days.

This patent is subject to a terminal disclaimer.

(21) Appl. No.: 14/733,692

(22) Filed: Jun. 8, 2015

(65) Prior Publication Data

US 2015/0379401 A1    Dec. 31, 2015

Related U.S. Application Data

(63) Continuation of application No. 14/475,135, filed on Sep. 2, 2014, now Pat. No. 9,053,421, which is a (Continued)

(51) Int. Cl.
   *G06N 5/02*     (2006.01)
   *G06F 17/30*    (2006.01)
   (Continued)

(52) U.S. Cl.
   CPC ............... *G06N 5/02* (2013.01); *G06F 17/00* (2013.01); *G06F 17/30339* (2013.01);
   (Continued)

(58) Field of Classification Search
   None
   See application file for complete search history.

(56) References Cited

U.S. PATENT DOCUMENTS

| 3,550,939 A | 12/1970 | Chase |
| 6,151,571 A | 11/2000 | Pertrushin |

(Continued)

OTHER PUBLICATIONS

Wu et al., "Human Computer Etiquette, A Socio-Linguistic Perspective," In Proceedings of the 53rd Annual Meeting of Human Factors and Ergonomics Society. Oct. 19-23, 2009, San Antonio, TX, 12 pages.

(Continued)

*Primary Examiner* — Alan Chen
(74) *Attorney, Agent, or Firm* — JoAnn M. Seaton; Griffiths & Seaton PLLC

(57) ABSTRACT

A system for evaluating communicative acts to determine a social network perception representation based on communicative acts between a plurality of communicative pairs where each communicative pair includes a first group and an individual or a second group participating in corresponding communicative acts. The system includes a patterns database, a scoring processor, and a communications network aggregation processor. The patterns database stores behavior recognition patterns defining particular behaviors and a score associated with each of the particular behaviors. The scoring processor is configured to determine a pairwise social perception score for each of the communicative pairs based on the particular behaviors identified in the communicative acts. The scoring processor is configured to determine a different pairwise social perception score for each of the communicative pairs. The communications network aggregation processor combines the pairwise social perception scores for each of the plurality of communicative pairs into a social perception network representation.

22 Claims, 11 Drawing Sheets

Related U.S. Application Data continuation of application No. 13/198,563, filed on Aug. 4, 2011, now Pat. No. 8,825,584.

(51) Int. Cl.
  *G06F 17/00*     (2019.01)
  *G06Q 10/06*     (2012.01)
  *G06Q 50/00*     (2012.01)

(52) U.S. Cl.
  CPC ....... *G06F 17/30345* (2013.01); *G06Q 10/06* (2013.01); *G06Q 50/01* (2013.01)

(56) References Cited

U.S. PATENT DOCUMENTS

| | | | |
|---|---|---|---|
| 6,185,534 B1 | 2/2001 | Breese et al. | |
| 6,332,143 B1 | 12/2001 | Chase | |
| 6,999,914 B1 | 2/2006 | Boerner et al. | |
| 7,260,519 B2 | 8/2007 | Polanyi et al. | |
| 7,778,948 B2 | 8/2010 | Johnson et al. | |
| 8,150,592 B2 | 4/2012 | Stewart et al. | |
| 8,160,867 B1 | 4/2012 | Shaw | |
| 8,209,182 B2 | 6/2012 | Narayanan | |
| 8,312,029 B2 | 11/2012 | Snell | |
| 8,326,002 B2 | 12/2012 | Hill | |
| 8,473,420 B2 * | 6/2013 | Bohus | G06Q 10/10 340/541 |
| 9,053,421 B2 * | 6/2015 | Miller | G06F 17/00 |
| 2002/0147508 A1 | 10/2002 | Miller et al. | |
| 2004/0210159 A1 | 10/2004 | Kibar | |
| 2006/0122834 A1 | 6/2006 | Bennett | |
| 2007/0015121 A1 | 1/2007 | Johnson et al. | |
| 2007/0067145 A1 | 3/2007 | Miller et al. | |
| 2007/0082324 A1 | 4/2007 | Johnson et al. | |
| 2009/0004633 A1 | 1/2009 | Johnson et al. | |
| 2009/0012760 A1 | 1/2009 | Schunemann | |
| 2009/0048823 A1 * | 2/2009 | Liu | G06F 17/2745 704/9 |
| 2009/0157589 A1 * | 6/2009 | Merugu | G06N 5/04 706/56 |
| 2011/0294099 A1 | 12/2011 | Brady | |
| 2012/0023545 A1 | 1/2012 | Qu | |
| 2012/0137367 A1 | 5/2012 | Dupont et al. | |
| 2012/0254333 A1 | 10/2012 | Chandramouli et al. | |

OTHER PUBLICATIONS

Miller et al., "Associates with Etiquette: Meta-Communication to Make Human-Automation Interaction more Natural, Productive and Polite," In Proceedings of the 8th European Conference on Cognitive Science Approaches to Process Control. Sep. 24-26, 2001, 10 pages.

Miller et al., "A Computational Approach to Etiquette: Operationalizing Brown and Levinson's Politeness Model," IEEE Intelligent Systems, vol. 23, No. 4, pp. 28-35. Jul./Aug. 2008.

Wu et al., "Interactive Phrasebook™—Conveying Culture Through Etiquette," In Proceedings of 10th International Conference on Inte+A25lligent Tutoring Systems, Jun. 14-17, 2010, Pittsburgh, PA, 9 pages.

Wu et al., "The Current Bottleneck for Computer-based Culture Training—Who Cares About Etiquette?" In Proceedings of 54th Annual Meeting of the Human Factors and Ergonomics Society,Sep. 28-Oct. 1, 2010, San Francisco, CA, 5 pages.

Miller, "Etiquette and Associates: Creating a well-behaved, Intelligent Subordinate," In Proceedings of the NATO Research and Technology Organization Special Workshop on Uninhabited Military Vehicles Leiden, Holland; Jun. 10-13, 2003, 2 pages.

Miller et al., "Etiquette and Effectiveness: How Should a Smart Home Interact?" In Proceedings of the International Conference on Aging, Disability and Independence, Dec. 4-6 2003; 2 pages.

Miller et al., "A Computational Approach to Etiquette and Politeness: An 'Etiquette Engine™' for Cultural Interaction Training", In Proceedings of the 2007 Conference on Behavior Representation in Modeling and Simulation. Norfolk, VA; Mar. 26-29 2009, 10 pages.

Miller et al., "The role of 'etiquette' in an automated medication reminder," In (T. Bickmore, Ed.), Working Notes of the AAAI Fall Symposium on Dialogue Systems for Health Communication (pp. 88-96). Menlo Park, CA: AAAI Press, 2004.

Miller et al., "The Etiquette Perspective for Human-Automation Relationships: Applications, Models and Results," In Proceedings of the 47th Annual Meeting of the Human Factors and Ergonomics Society, Oct. 13-17, 2003; Denver, CO, 4 pages.

Miller et al., "The Etiquette Perspective in Human-Automation Relations," In Proceedings of the 46th Annual Conference of the Human Factors and Ergonomics Society, Baltimore, MD; Oct. 2002, 3 pages.

Miller et al., "The "Etiquette Quotient": An Approach to Believable Social Interaction Behaviors," In Proceedings of the 14th Conference on Behavior Representation in Modeling and Simulation (BRIMS). May 16-19, 2005; Universal City, CA, 9 pages.

Miller, "The Etiquette Perspective on Human-Computer Interaction," In Proceedings of the 10th International Conference on Human-Computer Interaction, Jun. 22-27, 2003, Crete, Greece, 5 pages.

Wu et al., "Evaluating the Effects of Culture and Etiquette on Human-Computer Interaction and Human Performance," In Proceedings of the AAAI Spring Symposium, Mar. 23-25, 2009. Stanford, Palo Alto, CA, 8 pages.

Miller, "Human-Computer Etiquette: Managing Expectations with Intelligent Agents," Communications of the Association for Computing Machinery, vol. 47, No. 4, pp. 31-34, Apr. 2004.

Wu et al., "Interactive Phrasebook—Embeddding Human Social Dynamics in Language Training," In Proceedings of Second IEEE International Conference on Social Computing (SocialCom 2010) Aug. 20-22, 2010, Minneapolis, MN), 5 pages.

Miller et al., "A Computational Approach to Etiquette and Politeness: Initial Test Cases," In Proceedings of 2006 BRIMS Conference, May 15-18 2006, Baltimore, MS, 12 pages.

Wu et al., "Interactive Phrasebook, Language and Culture Training," Proceedings of the International Conference on E-Learning in the Workplace (ICELW), Jun. 12-13, 2008. Columbia University, New York, NY, 2 pages.

Miller et al., "Culture, Politeness and Directive Compliance: Does Saying 'Please' Make a Difference?" In Proceedings of the NATO RTO Symposium HFM-142 on Adaptability in Coalition Teamwork. Apr. 21-23. Copenhagen, 16 pages.

Wu et al., "Can Polite Computers Produce Better Human Performance?" In Proceedings of ACM Multimedia 2010 International Conference, Oct. 25-29, 2010 Firenze, Italy, 6 pages.

Miller et al., "Politeness and Etiquette Modeling: Beyond Perception to Behavior." In Blanchard, E. and Dalhousie, D. (Eds.) Handbook of Research in Culturally-Aware Information Technology: Perspectives and Models. IGI; Hershey, PA, 2010,. pp. 387-411.

Miller et al., "Politeness in Social Networks: Using Verbal Behaviors to Assess Socially-Accorded Regard," published in Social Computing (SocialCom), 2010 IEEE Second International Conference on Social Computing Aug. 20-23, 2010, 2 pages.

Wu et al., "Utilizing Human Computer Etiquette to Encourage Human-Machine Therapeutic Alliance," In Proceedings of the 13th International Conference on Human-Computer Interaction. Jul. 19-24, 2009, San Diego, CA, 6 pages.

Parasuraman et al., "Trust and Etiquette in High-Criticality Automated Systems. In C. Miller (Guest Ed.), special section on Human-Computer Etiquette". Communications of the ACM, vol. 47, No. 4, pp. 51-55, Apr. 2004.

Miller, "Trust in Adaptive Automation: The Role of Etiquette in Tuning Trust via Analogic and Affective Method," In Proceedings of the 1st International Conference on Augmented Cognition, Las Vegas, NV; Jul. 22-27, 9 pages.

(56) References Cited

OTHER PUBLICATIONS

Miller et al., "A Computational Approach to Etiquette and Politeness: Validation Experiments," In Proceedings of the First International Conference on Computational Cultural Dynamics, Aug. 27-28, 2007; College Park, MD, 9 pages.

Moira Burke et al. 2008. Mind your Ps and Qs: the impact of politeness and rudeness in online communities. In Proceedings of the 2008 ACM conference on Computer supported cooperative work (CSCW '08). ACM, New York, NY, USA 281-284.

C. Miller et al. "Politeness, Culture, Decision Making and Attitudes; Linking Brown and Levin-son to Directive Compliance". In Proceedings of the Applied Human Factors and Ergonomics (AHFE) International Conference 2010. Jul. 17-20, 2010; Miami, FL, 10 pages.

C. Miller et al., "Politeness Effects in Directive Compliance: Effects with Power and Social Distance". In Proceedings of the 2010 Annual Meeting of the Human Factors and Ergonomics Society, San Francisco, CA: Sep. 27-Oct. 1, 2010, 5 pages.

\* cited by examiner

120

| REDRESSIVE AND/OR IMPOSITION STRATEGY | OCCURRENCE COUNT | SCORE VALUE | WEIGHT | WEIGHTED SCORE VALUE |
|---|---|---|---|---|
| DESIRE | 0 | 0 | -0.5 | 0 |
| REQUEST | 4 | 4 | -1 | -4 |
| OUT GROUP | 18 | 18 | -0.5 | -9 |
| THIRD PERSON | 9 | 9 | .05 | 4.5 |
| WILCO | 0 | 0 | 1 | 0 |
| WORKING | 1 | 1 | 0.25 | 0.25 |
| APOLOGY | 6 | 6 | 0.5 | 3 |
| GRATITUDE | 4 | 4 | -0.5 | -2 |
| PLEASE | 3 | 3 | -1 | -3 |
| OPINION | 1 | 1 | -0.5 | -0.5 |
| LEADING DIRECTIVE | 71 | 83 | -0.5 | -41.5 |
| IN GROUP | 43 | 45 | 0.25 | 11.25 |
| | | | $V(A_X) =$ | -41 |

FIG. 6

SYSTEMS AND METHODS FOR DETERMINING SOCIAL PERCEPTION

CROSS-REFERENCE TO RELATED APPLICATION

This application is a continuation of and claims priority to U.S. patent application Ser. No. 14/475,135, filed Sep. 2, 2014, which is a continuation of and claims priority to U.S. patent application Ser. No. 13/198,563, filed Aug. 4, 2011, now U.S. Pat. No. 8,825,584, issued Sep. 2, 2014, all of which are incorporated herein by reference.

STATEMENT REGARDING FEDERALLY SPONSORED RESEARCH OR DEVELOPMENT

This invention was made with government support under contract number N0001 4-09-C-026 awarded by the Office of Naval Research. The government has certain rights in the invention.

BACKGROUND OF THE INVENTION

During interactions between one or more communicators, various social conventions are typically used based on the relationships of the communicators relative to one another. All such interactions carry a threat of altering one's perceived position in a social relationship. Oftentimes, various forms of politeness or redress are used to avoid one communicator giving offense to the other. Redress may take the form of positive or negative redress. Positive redress includes actions that are directed toward the desire of the recipient of the communication to have his needs, intentions, etc. accepted or liked. Negative redress includes actions focusing on the need of the recipient of the communication to independently take action and attention. The threat that one's position as perceived by others may be altered due to events or components of an interaction is a function of the power difference between the communicators, their degree of familiarity with one another, and the degree of imposition of the interaction. Typically, as the threat of a negatively altered position is increased, the politeness and redress used by the communicator facing the negative threat is also increased in an attempt to balance the communication.

BRIEF SUMMARY OF THE INVENTION

One embodiment of the invention relates to a system for evaluating communicative acts to determine a social network perception representation based on communicative acts between a plurality of communicative pairs. Each communicative pair includes a first group and one of an individual and a second group participating in a corresponding one or more of the communicative act. The system includes a patterns database, a scoring processor, and a communications network aggregation processor. The patterns database stores behavior recognition patterns defining particular behaviors and a score associated with each of the particular behaviors. The scoring processor is configured to determine a pairwise social perception score for each of the communicative pairs based on the particular behaviors identified in the communicative acts. The scoring processor is configured to determine a different pairwise social perception score for each one of the plurality of communicative pairs. The communications network aggregation processor is configured to combine the pairwise social perception scores for each of the plurality of communicative pairs into a social perception network representation. Other embodiments including other systems, methods, and products are also disclosed.

BRIEF DESCRIPTION OF THE DRAWINGS

Embodiments of the invention will be described with respect to the figures, in which like reference numerals denote like elements, and in which:

FIG. 6 is a spreadsheet illustrating one example of redressive elements of a communicative act scored to determine the redressive value of the communicative act, according to one embodiment of the present invention.

DETAILED DESCRIPTION

Figure 1:
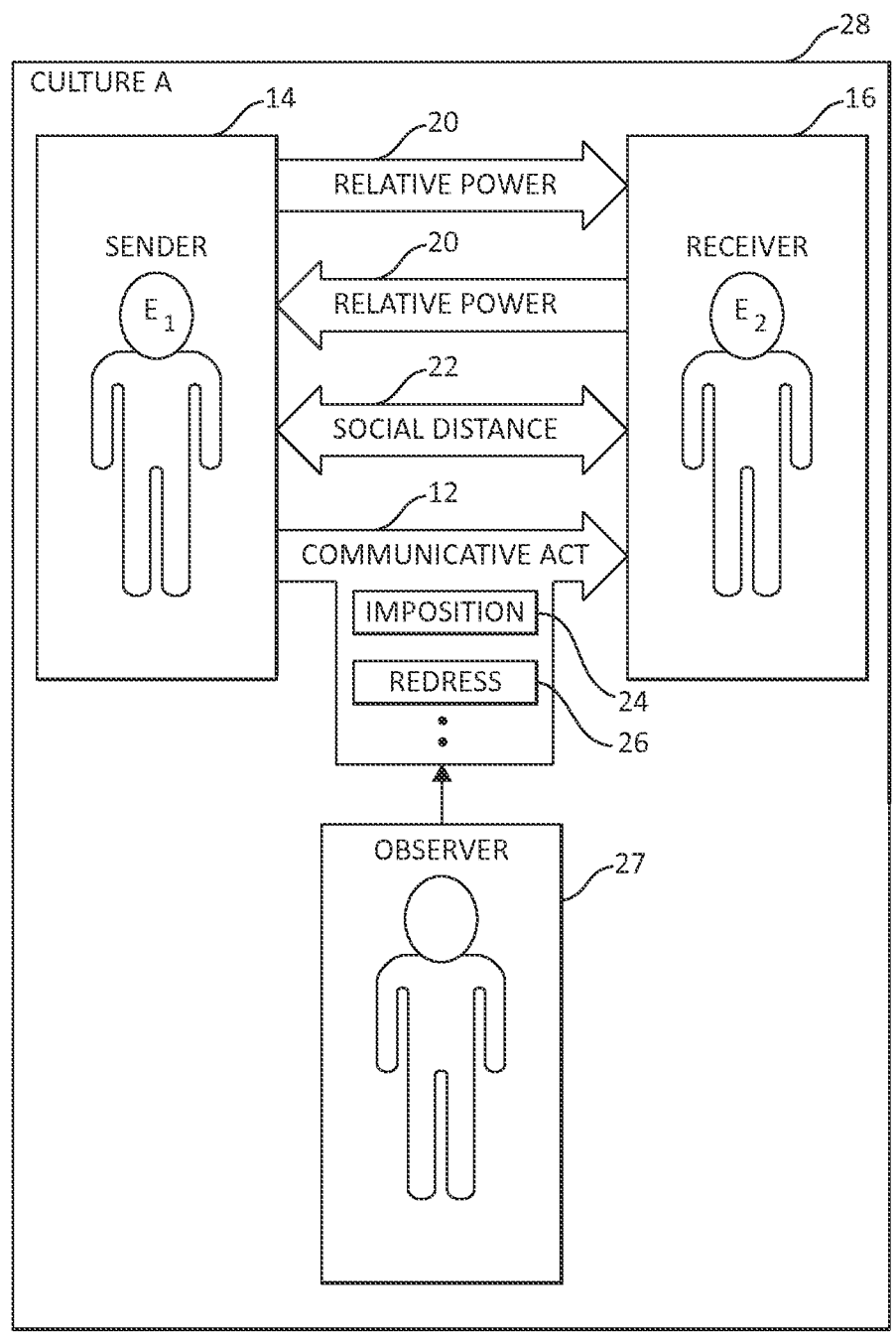
FIG. 1 is a schematic illustration of a communicative act between a sender and a receiver, according to one embodiment of the invention.

The following detailed description should be read with reference to the drawings, in which like elements in different drawings are numbered in like fashion. The drawings depict selected embodiments and are not intended to limit the scope of the invention. Those skilled in the art will recognize that many of the examples provided may have suitable alternatives that could be utilized with out departing from the spirit of the invention.

Observations of human communication can tell an observing individual who is familiar with the cultural norms used in the communication much about the relationships and attitudes of those entities involved in the communication. In general, social actors or entities are motivated by a set of wants including important social wants based on the concept of "face" or the positive social value one claims for oneself. Face can be saved or lost in any given communication between entities. Face threats stem from any intentional move that limits an entity's (i.e., person's or group's) ability to pursue his or her own goals and/or ability to maintain a belief that his or her perspective and beliefs are important and valued. Virtually all interactions between entities involve some degree of threat to the entity's face, that is, are face-threatening acts (FTAs).

Individual communications can be analyzed and scored to estimate the power or regard difference between communicating entities in the communication, for example, by assigning values to components of the communications, and placing the values into predefined equations relating to redressive acts and the power involved in such communications. In one embodiment, one or more computer processors are specifically programmed and configured to automatically perform such analysis and scoring using defined sets of scoring rules, patterns, templates, etc. as will be described in further detail below. In one example, such scoring, etc. is performed based on specific cultural patterns and norms to further enhance the cultural sensitivity, and thereby, bolster the accuracy of such programs. Once scoring is completed, in one example, the system outputs regard network mapping and various other outputs useful in analyzing the workings of the network based on power and regard. In one embodiment, the system and method described herein allows a network with a previously unknown hierarchy (i.e., unknown to the party employing this system and method) to be mapped. In one embodiment, this system and method allows for mapping and other analysis of a known network to study the regard and power asserted and displayed therein.

In one theory, for example, presented by Brown and Levinson (see P. Brown & S. Levinson, Politeness: Some Universals in Language Usage, p. 76. Cambridge, UK: Cambridge Univ. Press, 1987, which is incorporated herein by reference), the weightiness W of a FTA relates to the power level P between the sender and the receiver, the social distance D between the sender and the receiver, and the ranked imposition R of the communicative act. Brown and Levinson further claim the degree of face threat posed by any given communicative act is represented by the following qualitative function:

$$W_x = P(R,S) + D(S,R) + R_x \quad \text{(Equation 1)}$$

Where:
$W_x$=weightiness or severity of the face threatening act x;
$P(R,S)$=the relative power of the receiver R over the sender S; this is an asymmetrical relationship;
$D(S,R)$=the social distance between the sender S and the receiver R; this is a symmetrical relationship; and
$R_x$=the ranked imposition of the raw act.

Accordingly to one embodiment of the invention, FIG. 1 schematically illustrates a communicative act 12 between a communicative pair including a first entity $E_1$ and a second entity $E_2$. More specifically, in FIG. 1, first entity $E_1$ is the sender 14 of communicative act 12 and second entity $E_2$ is the receiver 16 of communicative act 12. First entity $E_1$ and second entity $E_2$ are each a person, group, etc. capable of communicating via communicative act 12, which may be a verbal, text-based, or gesture encoded (email, text, letter, chat, message board, blog, etc.) communication. First entity $E_1$ and second entity $E_2$ are related to one another, for example, as part of a larger entity or organization and a relative power 20 and a social distance 22 exist between the two.

In one embodiment, observer 27 is a third party entity that may or may not be part of the larger entity or organization that listens, views, observes, and/or analyzes communicative act 12. In one example, observer 27 analyzes communicative act 12 unbeknownst to sender 14 and receiver 16 according to the systems and processes described in this application while in another example, sender 14 and/or receiver 16 is aware of the presence of observer 27. In one example, observer 27 is or is aided by a computer processing system analyzing communicative act 12, as will be apparent to those of skill in the art upon reading this application.

Relative power 20 or power distance represents the difference in power between first entity $E_1$ and second entity $E_2$. Relative power 20 is generally an asymmetrical relationship, where the one of first entity $E_1$ and second entity $E_2$ having more power will have a positive relative power 20 score over the other of first entity $E_1$ and second entity $E_2$, and the one of first entity $E_1$ and second entity $E_2$ having less power will have a negative relative power 20 score over the other of first entity $E_1$ and second entity $E_2$. Power comes from different sources in different cultures and organizations and is particularly important in military, pseudo-military, and other high-level civilian organizations.

Social distance 22 is symmetrical between first entity $E_1$ and second entity $E_2$ and is roughly the inverse of familiarity. As such, social distance 22 decreases with contact and interaction between first entity $E_1$ and second entity $E_2$ and/or may be based on a priori factors such as membership in the same family, clan, or organization.

Ranked imposition 24 of a communicative act relates to the raw act itself. The more sender 14 is asking of receiver 16 the higher the imposition. Imposition calculations are based on the weighted sum of the monetary value, time commitment, and opportunity cost to the receiver that is required for the completion of the task presented in communicative act 12. Some degree of imposition is culturally defined. For example, it is more of an imposition to request food from a host in a Western culture than in an Arabic culture. Ranked imposition 24 is the degree of imposition present in communicative act 12.

Communicative act 12, relative power 20, and social distance 22 do not occur in a vacuum, but rather are influenced by a culture 28 in which they occur or exist. The impact of the various components of power, social distance, imposition, etc. change based on the cultural norms and influences of given culture 28. As such, according to one embodiment, the above qualitative weightiness function can be further refined and expressed as the following quantitative function:

$$W_x = W_A \cdot P(R,S) + W_B \cdot D(S,R) + W_C \cdot R_x \quad \text{(Equation 2)}$$

Where previously introduced variables are as described above and:
$W_A$, $W_B$, and $W_C$=the respective scalar values applied to the variables based on the importance that an observer (e.g., the receiver) believes should be attributed to a respective element given culture 28 in which the communicative act is occurring.

Figure 2:
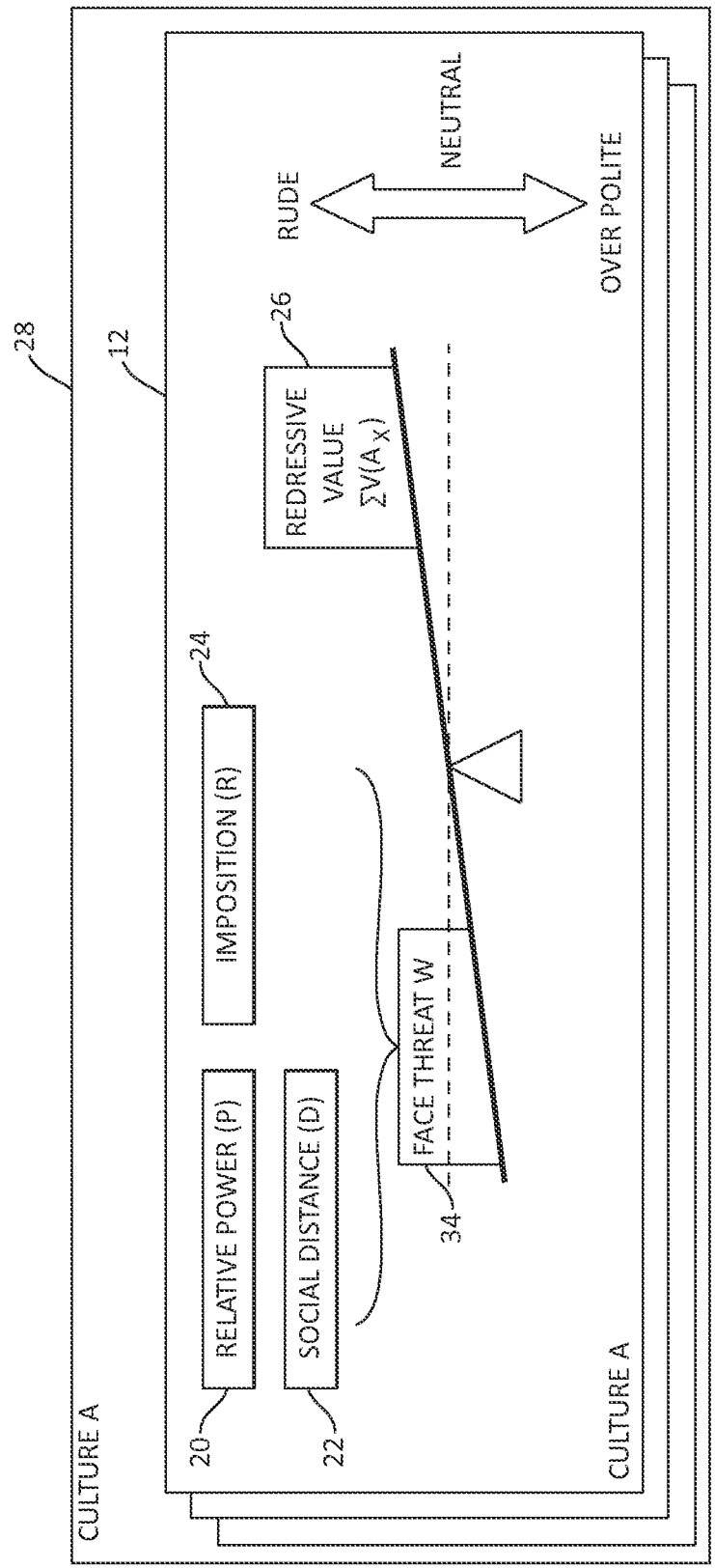
FIG. 2 is schematic illustration of relational components between a sender and a receiver, according to one embodiment of the invention.

Since face threats can degrade or at least disrupt relationships between communicating entities such as first entity $E_1$ and second entity $E_2$, entities often use redressive strategies to mitigate the face threat. In modeling the invention described in further detail below and referring to the schematic illustration of FIG. 2, in typical communicative acts 12, redress 26 is meant to balance out or neutralize the weightiness W of communicative act 12. However, if too much redress or not enough redress is employed in communicative act 12, an imbalance in communicative act 12 is created. Such imbalance is represented by the following function:

$$I_x = V(A_x) - W_x \quad \text{(Equation 3)}$$

Where:

$I_x$=the perceived imbalance between the face threat and the redress used;

$V(A_x)$=the combined redressive value of the set of politeness behaviors ($A_x$) used in the interaction x; and $W_x$=the weightiness or severity of face threatening act x.

Following this equation for imbalance, when less redress is used than is perceived necessary, imbalance is negative and the communicative act is perceived as rude. When more politeness is used than is deemed necessary, then the calculated imbalance will be positive and the communicative act will be perceived as over-polite or obsequious. Small levels of imbalance are very common and are largely ignored in everyday communications.

Classes of redressive strategies include off-record strategies, negative redress strategies, and positive redress strategies. Off-record strategies complete the communicative act of imposition but with "plausible" deniability using innuendo and hints. Examples of off-record redress include giving hints about motives or conditions for doing the act, giving association clues, presuppositions, understatements, overstatements, use of tautologies, use of contradictions, use of irony, use of metaphors, use of rhetorical questions, use of ambiguity, vagueness, user of over-generalizations, incomplete statements (e.g., use of ellipsis), etc.

Negative redress strategies focus on receiver's 16 need to independently take action and attention, i.e., negative face needs. Such strategies tend to minimize the impact of the imposing act by being direct and simple, offering apologies and deference, minimizing the magnitude of the imposition, and/or explicitly incurring a debt. In general, negative redress strategies are common when power differences between sender 14 and receiver 16 are acknowledged and supported and, as a class, said to be more potent than positive redress, but less potent than off-record strategies. Examples of negative redress strategies include using questions or hedging, being conventionally indirect, being pessimistic, giving deference, offering a direct apology, impersonalizing the act by avoiding the pronouns "I" and "you," nominalizing the act, incurring debt, and/or not indebting the receiver.

Positive redress strategies go after the positive face of receiver 16, that is, his desire to have his needs, intentions, etc. be accepted or liked. Positive redress strategies emphasize common ground between sender 14 and receiver 16 invoking an in-group identity, by joking and assuming agreement, and/or explicitly offering rewards or promises. Examples of positive redress include attending to recipient's interests, wants, needs, and/or goods; exaggerating interest; approval, or sympathy with the receiver; intensifying interest to the receiver; use of in-group only markers; seeing agreement; avoiding disagreement; presupposing or asserting common ground; joking; use of promises; expressing optimism; including receiver 16 in the activity; giving reasons for the action; assuming or asserting reciprocity; and giving gifts to receiver 16. Positive redress is more likely to be used where power differences either are minimized or do not exist and tends to minimize social distance.

In one embodiment, general behavior recognition patterns 72 include a scoring system for redressive acts. For example, individual positive redressive elements are assigned a numerical value between 1 and 40 depending on their pre-judged potency (i.e., strength of redress in actually saving face), and individual negative redressive elements are assigned a numerical value between 20 and 60 based on the pre judged potency of such redress. In one embodiment, off-record redress strategies are largely ignored for scoring purposes, as they are more difficult to identify and tend to be idiosyncratic. In one embodiment, off-record redress strategies are scored. The specific values for individual acts are pre-assigned by individuals knowledgeable about the specific culture for the communicative acts, etc. Notably, there may be, and commonly are, multiple redressive strategies used in a single communicative act. The numerical score for each strategy or communicative element is combined (e.g., summed) to get the final redressive act value.

By ascribing numerical scored values to each of the relative categories described above and the individual communicative acts 12 within each category, unknown entities within an organization can be compared and given a pairwise regard or power score. The aggregation of the regard and/or power scores between paired entities can then be combined with scores for other pairs of entities to produce a directed graph or map of the power or regard of individuals relative to one another in an organization. These relative mappings are then combined to produce an organizational regard chart, which typically matches or closely resembles a general organizational chart for the group or organization and/or other suitable output.

In one embodiment, the calculations are based on Equation 3 expressed above, resulting in the following expression of power and social distance, otherwise referred to as regard:

$$\text{Regard}=P+D=V(A_x)-R-I_x \quad \text{(Equation 4)}$$

P=the relative power of the receiver R over the sender S;

D=the social distance between the sender S and receiver R;

$V(A_x)$=the combined redressive value of the set of politeness behaviors ($A_x$) used in the interaction x;

$R_x$=the ranked imposition of the raw act; and $I_x$=the perceived imbalance between the face threat and the redress used.

Most interactions between entities are intended to be perceived with an imbalance $I_x$ of (or near) zero. In many instances, social distance is nominal in comparison to the other values involved especially where all analyzed entities are subject to at least some predisposed relationship, e.g., are part of the same group, organization, sect, etc. Then, regard and power can be expressed as:

$$P=V(A_x)-R \quad \text{(Equation 5)}$$

In such examples, a redressive score is assigned to each communicative element of the communicative act 12 and summed. Subtracting the ranked imposition of the act, based on a pre-defined set of scoring rules, provides a relative estimate of regard and/or power of an entity within the organization. This process is repeated for multiple communicative acts 12 and averaged or otherwise combined to give an overall regard or power score.

Figure 3:
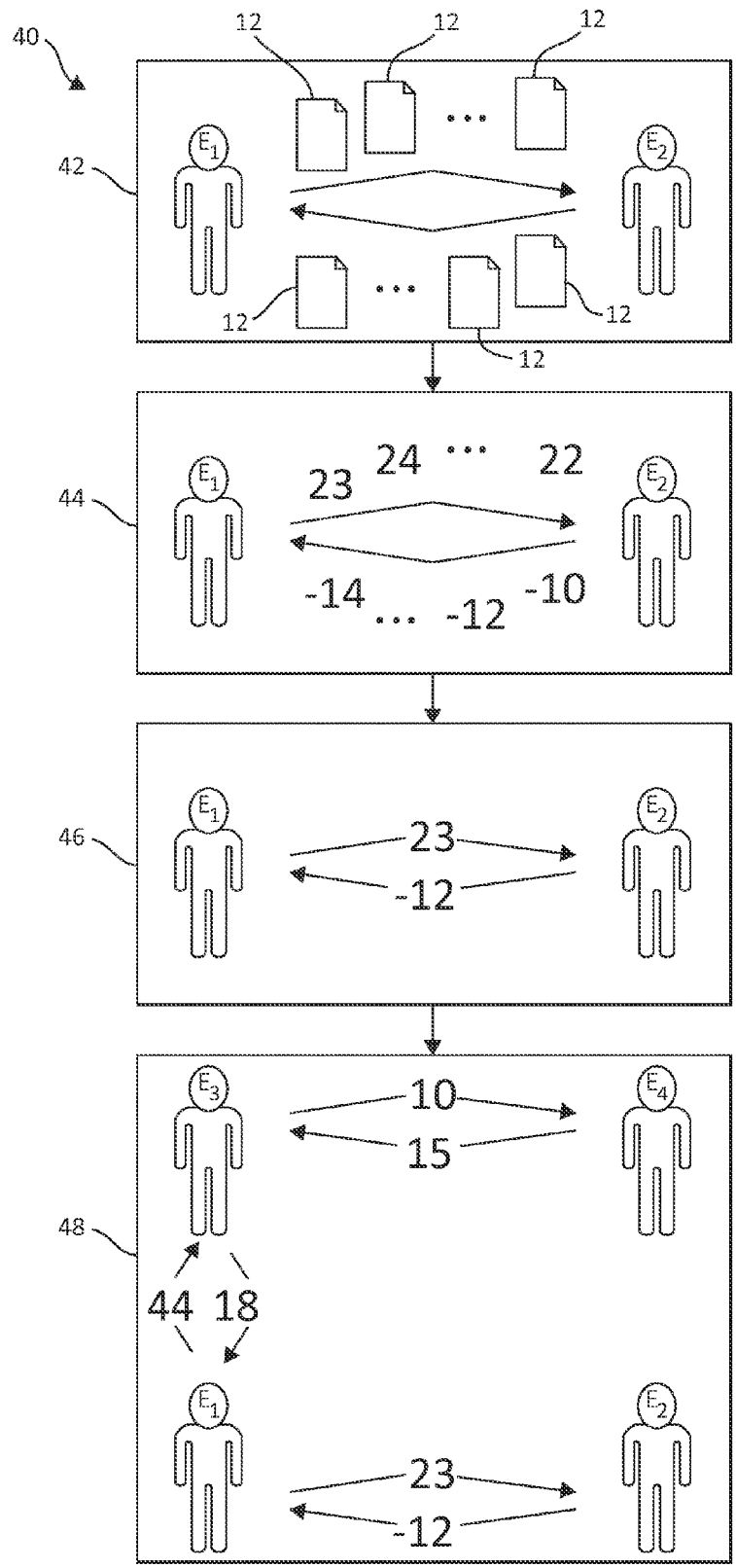
FIG. 3 is a flow chart illustrating a general method for building a regard network, according to one embodiment of the present invention.

FIG. 3 illustrates a general method 40 used to map an organization based on regard. More detailed embodiments will be further described below. At 42, textual versions of communicative acts 12 (see FIG. 1) between entities, e.g., first entity $E_1$ and second entity $E_2$, are collected. In one embodiment, communicative acts 12 are collected via one or more of transcriptions of spoken (phone or face-to-face) communications, internet relay chat (IRC), forum communications, emails, social networking tools (e.g., Twitter® and Facebook®), and blogs among other possible sources.

At 44, regard evaluation system 50 (see FIG. 4) parses communicative acts 12 (see FIG. 1) collected and scores the elements following basic guidelines and scoring set forth below to produce a regard score for each sender 14 (see FIG. 1) in each communicative act 12, for example, based on the equations presented above. In one embodiment, the regard scores are calculated from the perspective of the respective sender. Positive numbers imply high regard while negative numbers imply negative regard or apathy. At 46, regard evaluation system 50 combines all regard scores between two entities, e.g., first entity $E_1$ and second entity $E_2$, into a single aggregated regard score by averaging the individual regard scores or by other suitable methods to provide a more neutral regard score than the individual regard scores that may be slightly skewed due to their basis on the perception of the respective sender only.

Then, at 48, regard evaluation system 50 uses the aggregated regard scores between two entities, e.g., first entity $E_1$ and second entity $E_2$, in combination with the regard scores between first entity $E_1$, second entity $E_2$, and other entities (e.g., third entity $E_3$ and fourth entity $E_4$ as illustrated) in the organization to create a social regard or power graph or map. As shown in the limited map as in operation 48, arcs between the same entity nodes are grouped and numbers next to the entity indicate the regard for that entity.

For example, as shown in FIG. 3, first entity $E_1$ has a regard score of −12 with respect to second entity $E_1$ and a regard score of 18 with regard to third entity $E_3$. These scores in comparison with the respect regard scores of second entity $E_2$ and third entity $E_3$ relative to first entity $E_1$ (i.e., 23 and 44 respectively as illustrated), would tend to indicate that first entity $E_1$ would fall in a resulting regard social network below both second entity $E_2$ and third entity $E_3$ as both second entity $E_2$ and third entity $E_3$ have higher regard scores than first entity E1 relative to one another. In one embodiment, as described below, the two regard scores between a pair of entities (e.g., first entity E1 and second entity E2) are combined (e.g., averaged) resulting in a single pairwise regard score (not shown in FIG. 3) between the two entities in the communicative pair. Averaging the two regard scores, which are each based on the perception of the respective sender, provides a more neutral regard score less likely to be skewed by misperception of the respective senders. Other methods of graphing such data will be apparent to those of skill in the art upon reading the present application.

Figure 4:
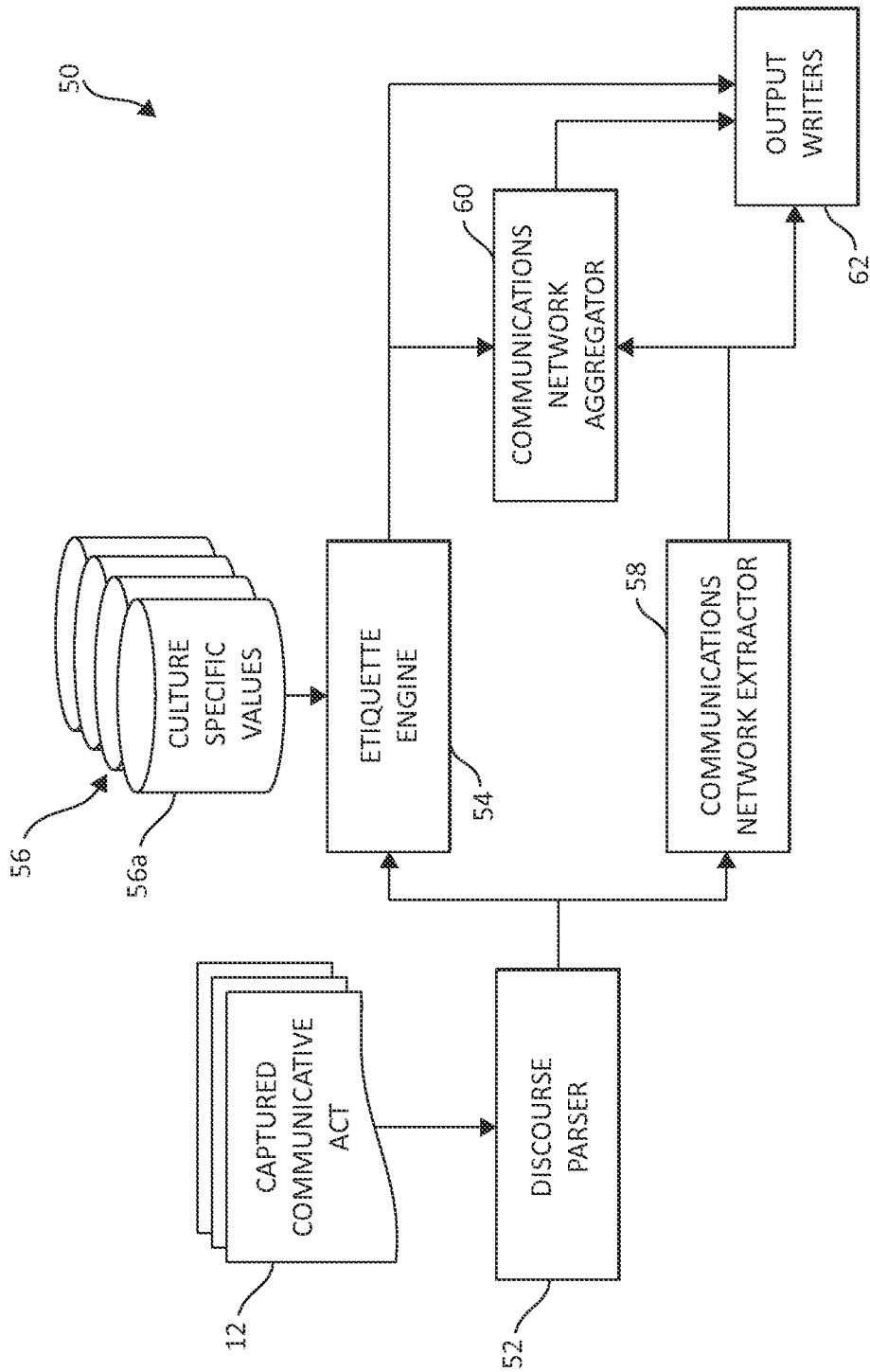
FIG. 4 is a schematic illustration of a regard evaluation system for receiving and evaluating communicative acts based on social regard, according to one embodiment of the invention.

One embodiment of a regard evaluation system 50 is illustrated in FIG. 4 and includes discourse parser 52, etiquette engine 54, culture specific value databases 56, communications network extractor 58, communications network aggregator 60, and output writers 62. Generally speaking, regard evaluation system 50 is configured to receive captured communicative acts 12, to evaluate such communicative acts 12 based on predetermined scoring principles, and to output useful data sets including social regard networks indicating the power chart or map of an organization.

More specifically, in one embodiment, discourse parser 52 is a hardware processor or similar component. In one example, discourse parser 52 is configured to break down communicative acts 12 into grammatical parts, uncover the underlying functional relationship between such parts, and pass along such information for further analysis by etiquette engine 54 and/or communications network extractor 58. In one embodiment, discourse parser 52 further labels and/or identifies the entities participating in each communicative act 12. More specifically, discourse parser 52 may actually identify an entity by its name, etc. or may instead simply identify an entity as being a separate unit and assigning an anonymous identifier to the entity, e.g., $E_n$. In one embodiment, discourse parser 52 functions substantially automatically without human interaction with discourse parser 52 once discourse parser 52 receives communicative acts 12 for analysis.

Figure 5:
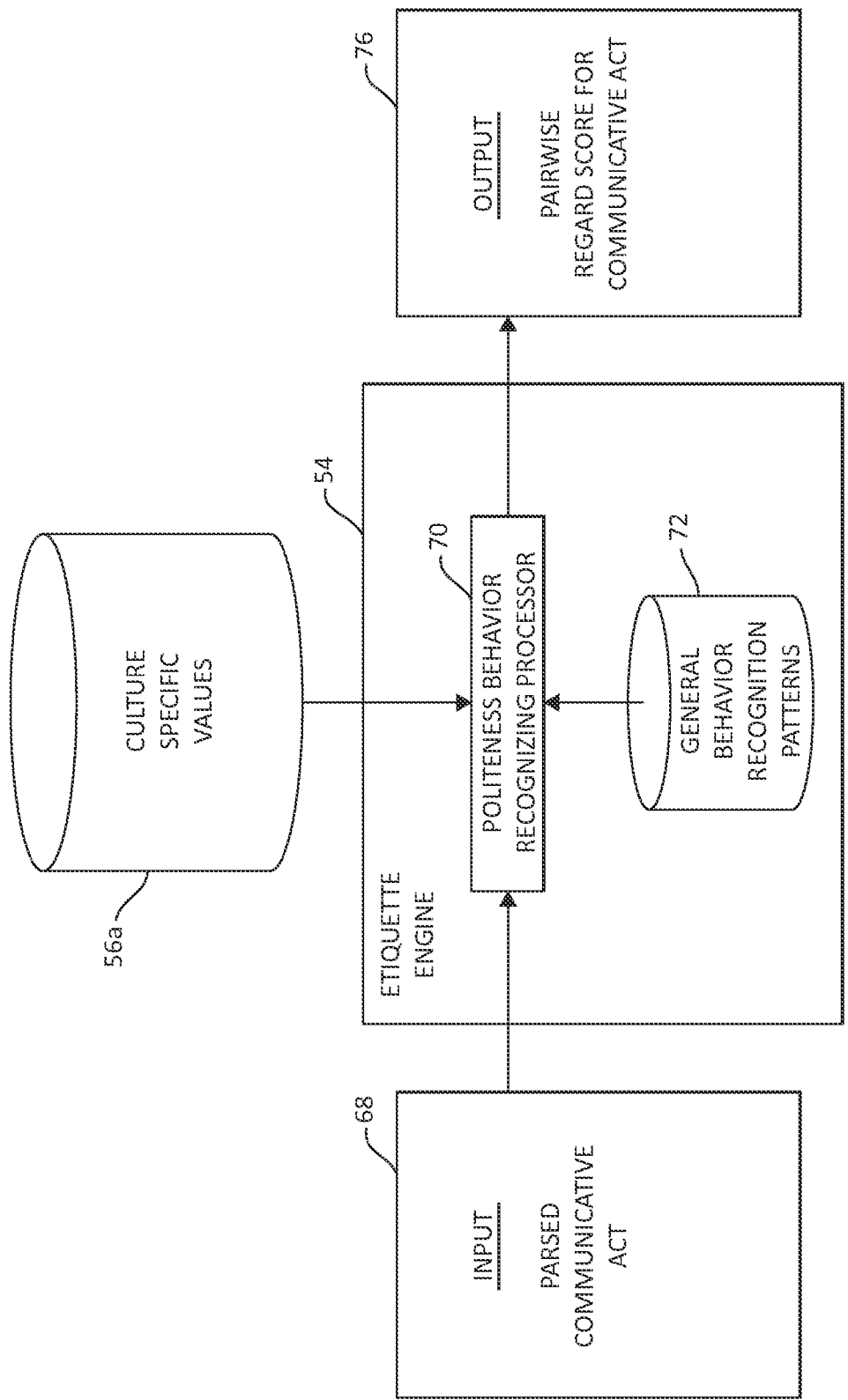
FIG. 5 is a schematic illustration of a portion of the system of FIG. 4, according to one embodiment of the present invention.

Etiquette engine 54 includes a hardware processor or similar component that receives the parsed communicative acts from discourse parser 52. Using patterns, rules, and/or algorithms as well as a selected one of cultural specific patterns obtained from the respective culture specific values database 56a selected from the plurality of such databases 56 or records within a single database, etiquette engine 54 scores elements of communicative act 12 and combines the element scores, e.g., per the above or similar equations to produce relative power scores for entities involved in communicative acts 12. In one embodiment, as more specifically indicated in FIG. 5, etiquette engine 54 includes a politeness behavior recognizing processor 70 and a general behavior recognition patterns database 72. In one embodiment, general behavior recognition patterns database 72 includes patterns for scoring parsed communicative acts 68 received from discourse parser 52 (see FIG. 4), for example, following various principles described in this application. Examples of additional details of patterns for scoring elements of communicative acts 12 are described in Miller, C., Wu, P., Funk, H., Wilson, P, and Johnson, L. (2006); A computational approach to etiquette and politeness: Initial test cases; In *Proceedings of the* 15*th Conference on Behavior Representation in Modeling and Simulation* (*BRIMS*); 15-18 May 2006; Baltimore, Md., which is incorporated by reference herein. Other scoring variations will be apparent to those of skill in the art upon reading the present application. Following scoring, etiquette engine 54, more precisely, politeness behavior recognizing processor 70, outputs pairwise power or regard scores for each communicative act 12 or group of communicative acts 12 as generally illustrated in FIG. 5 at 76.

In one embodiment, scoring communicative acts 12 includes looking for the inclusion or omission of specific elements in each communicative act 12 and the politeness of such inclusion or omission as outlined, for example, in general behavior recognition patterns database 72. For example, in an email exchange, the inclusion of a salutation, greeting/recognition, closing, and signature are among the elements of communicative act 12 considered during scoring. Salutations (e.g., "hi," "dear," "good morning," etc.) are forms of well wishing or gift giving and are examples of positive redress strategies. As such, general behavior recognition patterns database 72 will include positive redress scores for each of a plurality of specific or types of salutations. Greetings/recognitions refers to the use or non-use of a name or names of receiver 16. Name use can be considered either a positive or a negative redress strategy depending on the degree of formality and/or use of an honorific. Accordingly, in one embodiment, general behavior recognition patterns database 72 will include positive redress scores for each of a plurality of specific or types of greetings and recognitions included in an email based communicative act. The presence of a closing (e.g., regards, thanks, cheers, etc.) in an email communicative act 12 are generally positive redress strategies (offering, incurring debts, well-wishing), but can occasionally be negative redress strategies, such as where a closing offers an apology, etc. In one embodiment, general behavior recognition patterns database 72 will include positive redress scores for each of a plurality of specific or types of closings. Use of a signature apart from a machine generated closing address generally is a sign of deference and respect, i.e., a negative redress strategy resulting in a positive, but generally relatively small, redress score.

In one embodiment, other elements of communicative acts 12 are scored for their redress values (whether a positive or negative value), for example, such elements include one or more of the following: presence of typographical errors, use of abbreviations, complete vs. fragmented sentence structure, positive and negative redress strategies (e.g., desires, requests, third person references, apologies, use of gratitude components, use of please, provision of opinion, directives provided, and in group or out group references), etc. In one example, each occurrence of the redressive elements described above and/or other redressive elements having a predefined score, e.g., stored in politeness general behavior recognition patterns database 72 and/or the selected culture specific values 56a, is tabulated and multiplied by a per occurrence score or value from the politeness general behavior recognition patterns database 72 and/or a weighted value from culture specific value database 56a (e.g., in the form of a cultural module plugged into the determinations of etiquette engine 54). The specific values used for the scores for each redressive element can vary per different designs of regard evaluation system 50, but should range in value to indicate the magnitude of potency of the particular act. For example, while one embodiment of regard evaluation system 50 may assign 0.2 and 0.4 values to two different redress elements, another embodiment of regard evaluation system 50 may assign 50 and 100 values to the same two different items where the fact that one redress items is twice as potent at the second is the primary consideration, not the arbitrary scoring scale applied thereto. In one embodiment, etiquette engine 54 functions automatically without human input or intervention to analyzed the elements of communicative acts 12.

For example, FIG. 6 illustrates a spreadsheet 120 showing a listing of redressive strategies searched for in a communicative act 12, the number of occurrences for each redressive strategy (i.e., the occurrence count), a score value for the respective redressive strategy from politeness general behavior recognition patterns database 72, and a weight for the respective redressive strategy from culture specific value database 56a, for example. Multiplying the occurrence count by the score value and the weight produces a weighted score value. The weighted score values are summed to arrive at the combined redressive value (i.e., $V(A_x)$) for the corresponding communicative act. Other redressive strategies, score values, weight, etc. and summing methods will be apparent to those of skill in the art upon reading the current application.

In one example, communications network extractor 58 includes a processor or other hardware component. While illustrated as being separate components, in one embodiment, a single computer defines both the processor for etiquette engine 54 and communications network extractor 58. Communication network extractor 58 uses the parsed communicative acts 12 output from discourse parser 52 to analyze non-etiquette factors, such as the amount or type of contact between entities in a pairwise manner, common communications, document usage, or other indications in communicative acts linking two entities to one another, to create a working network of entities based on the non-etiquette factors. For example, communicative acts 12 by one entity, e.g., first entity $E_1$ or other sender 14, to another entity, e.g., second entity $E_2$ or other receiver 16, mentioning the other entity, copying the other entity, or matching other non-etiquette factors are analyzed, aggregated, and then compared to the aggregated scores of other pairwise entities to create a map or other indication of a social regard network. In one embodiment, communications network extractor 58 functions automatically without human input or intervention to analyze communicative acts 12.

Communications network aggregator 60 includes a processor or other hardware component. In one embodiment, communications network aggregator 60 receives the pairwise scores from etiquette engine 54 regarding politeness and redress used in communicative acts 12 and the pairwise and estimated network analysis from communications network extractor 58. Using this input, communications network aggregator 60 builds a power or regard network map outlining the hierarchy of an organization being analyzed. In one embodiment, the resulting regard network is based primarily on pairwise scores from etiquette engine 54 and uses output from communications network extractor 58 to fill in any holes in the pairwise scores from etiquette engine 54, e.g., where no communicative acts 12 were identified between two entities and/or where the pairwise scores from etiquette engine 54 produce ambiguities. In one example, communications network aggregator 60 uses force-based 2D graph-layout algorithms to determine a one dimensional regard network. In one embodiment, communications network aggregator 60 functions automatically without human input or intervention to analyze the elements of communicative acts 12.

In one embodiment, output items, e.g., pairwise scores or network determinations, from any, some, or all of etiquette engine 54, communications network extractor 56, and communications network aggregator 58 are sent to one or more output writers 62, e.g. processors or other hardware with computer readable instructions to generate various outputs. The one or more output writers 62 is configured to take the data received from etiquette engine 54, communications network extractor 58, and communications network aggregator 60 and to organize the data into any suitable output format such as maps, graphs, spreadsheets, etc. in one or both of user interface or printable format.

Figure 7:
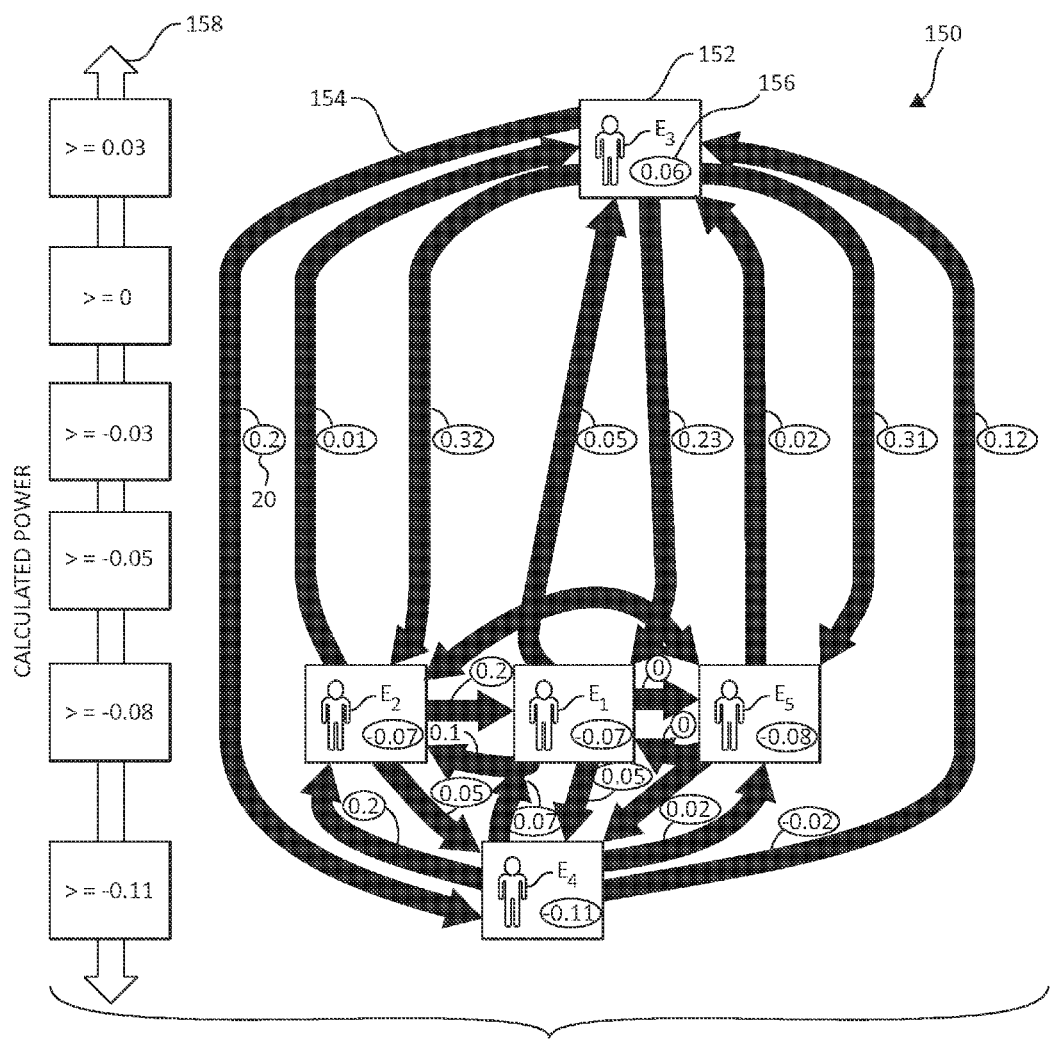
FIG. 7 is a schematic illustration of an output showing a power-based network indicating communication volume, according to one embodiment of the present invention.

FIG. 7 illustrates one example of an output from output writers 62 in the form of a communications map 150. Communications map 150 includes entity representations 152 for each entity analyzed (i.e., each entity that is one of sender 14 and receiver 16 in a communicative act 12). Arrows 154 extend between entity representations 152 indicating a direction of communicative acts 12, where, in one embodiment, the thickness of arrows 154 vary to indicate the relative quantity of communicative acts 12 between each entity pair. Each arrow 154 is labeled with a relative power 20 scored to the entity pair, and, in one example, each entity representation 152 includes a final power score 156 for the respective entity. In one example, a legend or axis 158 is included to further illustrate the variations in power values from bottom to top (or from left to right) ends of the power mapping.

Figure 9:
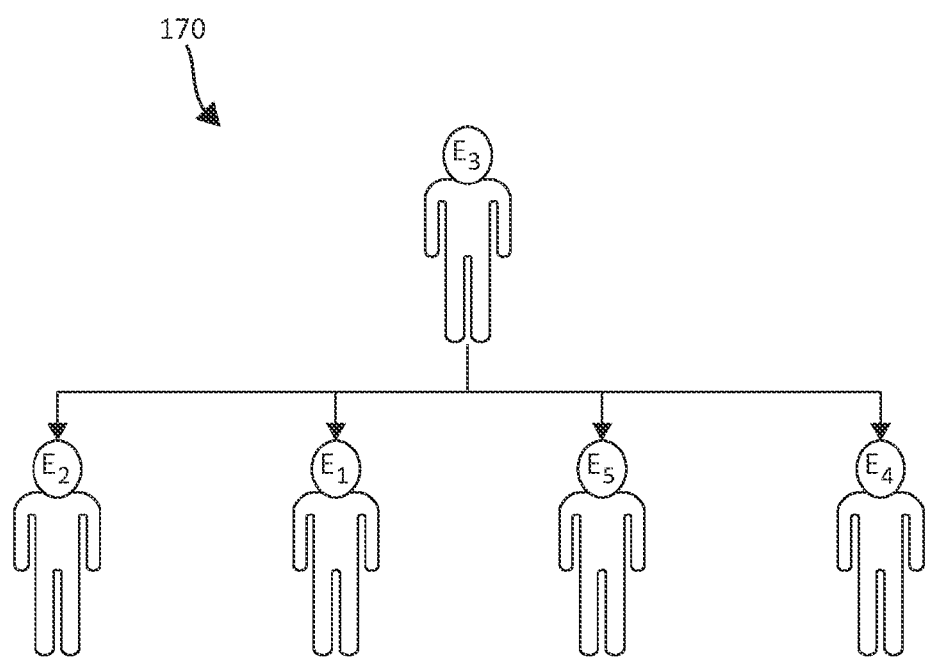
FIG. 9 is a schematic illustration of a social regard network, according to one embodiment of the present invention.

In one embodiment, output writers 62 are configured to output a distilled organizational chart or hierarchy 170 for the social regard network, as generally illustrated in FIG. 9, based on the aggregated data. While the illustrated hierarchy 170 is fairly small, one of ordinary skill in the art will appreciate upon reading this application, that the disclosed system and method can be used on a much larger scale and, therefore, create much more detailed hierarchies and social regard mappings.

Figure 10:
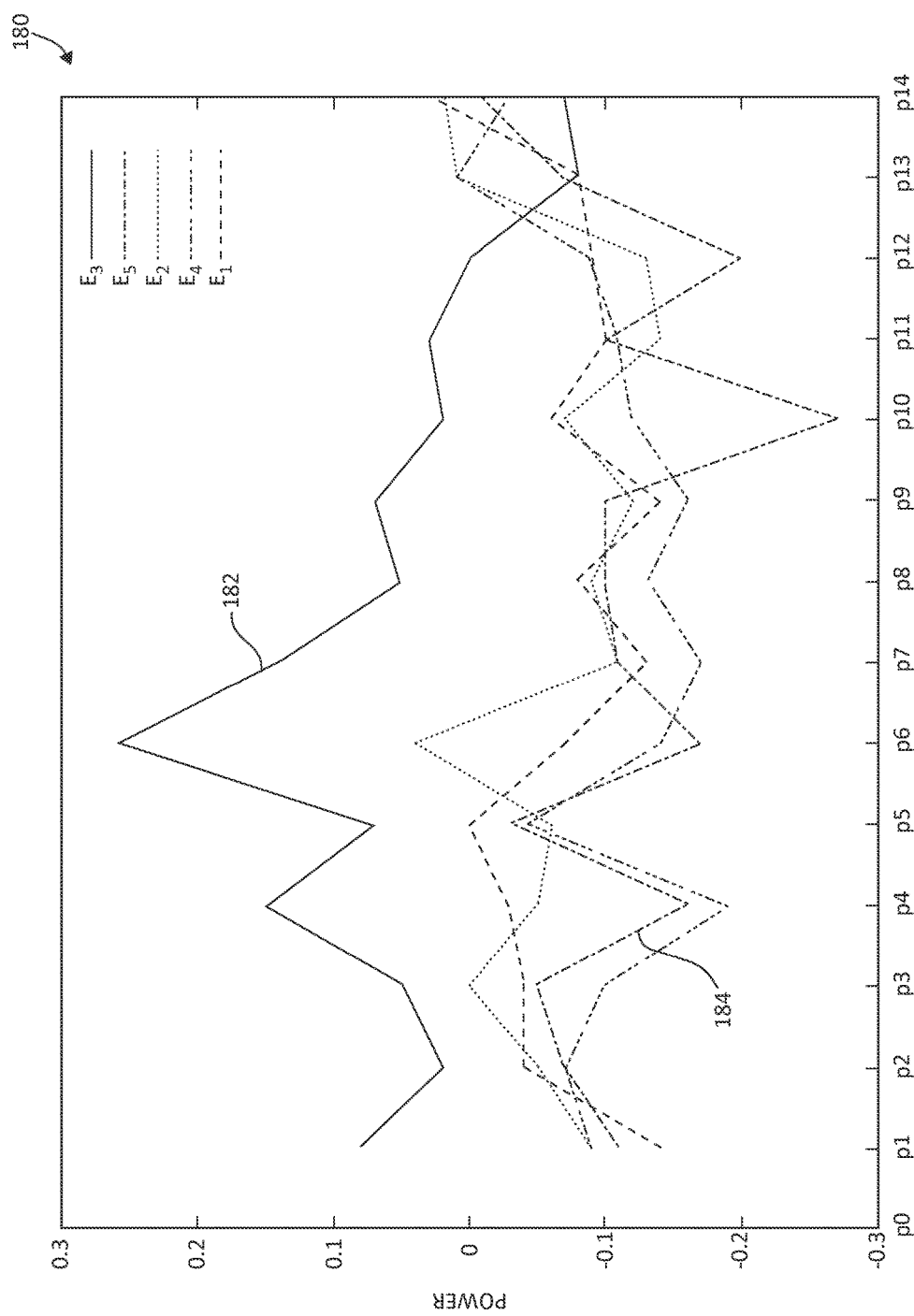
FIG. 10 is a graphical output indicating changes in entity regard over time, according to one embodiment of the present invention.

FIG. 10 illustrates another output format, whether provided as a user interface or printed output, from output writers 62. More specifically, power vs. time graph 180 illustrates the power ranking for each entity or a group of the entities being considered over a time wherein each time increment is for a predefined period. Such information can be useful in determining the period when important events occur in an organization. For example, graph line 182 represents the power of a third entity $E_3$ showing marked spikes in power during period 4 and period 6. Such rises could be attributable to many items, for instance, the arrival of a new organizational member causing third entity $E_3$ to show power to appear strong to the new organizational member, etc. The data regarding the spike in power may indicate that some fairly significant event occurred, but, in one embodiment, does not provide more context as to what specific event occurred.

In addition, in one embodiment, fifth entity $E_5$ generally shows a sharp downturn in power rankings at the same time the power rankings for third entity $E_3$ increase. While the reasoning behind the inverse power of third entity $E_3$ and fifth entity $E_5$ is unknown, the occurrence is readily viewable via graph 180 and represents an interesting phenomenon and points investigators' attention toward determining the reason for such power relationship changes.

Figure 8:
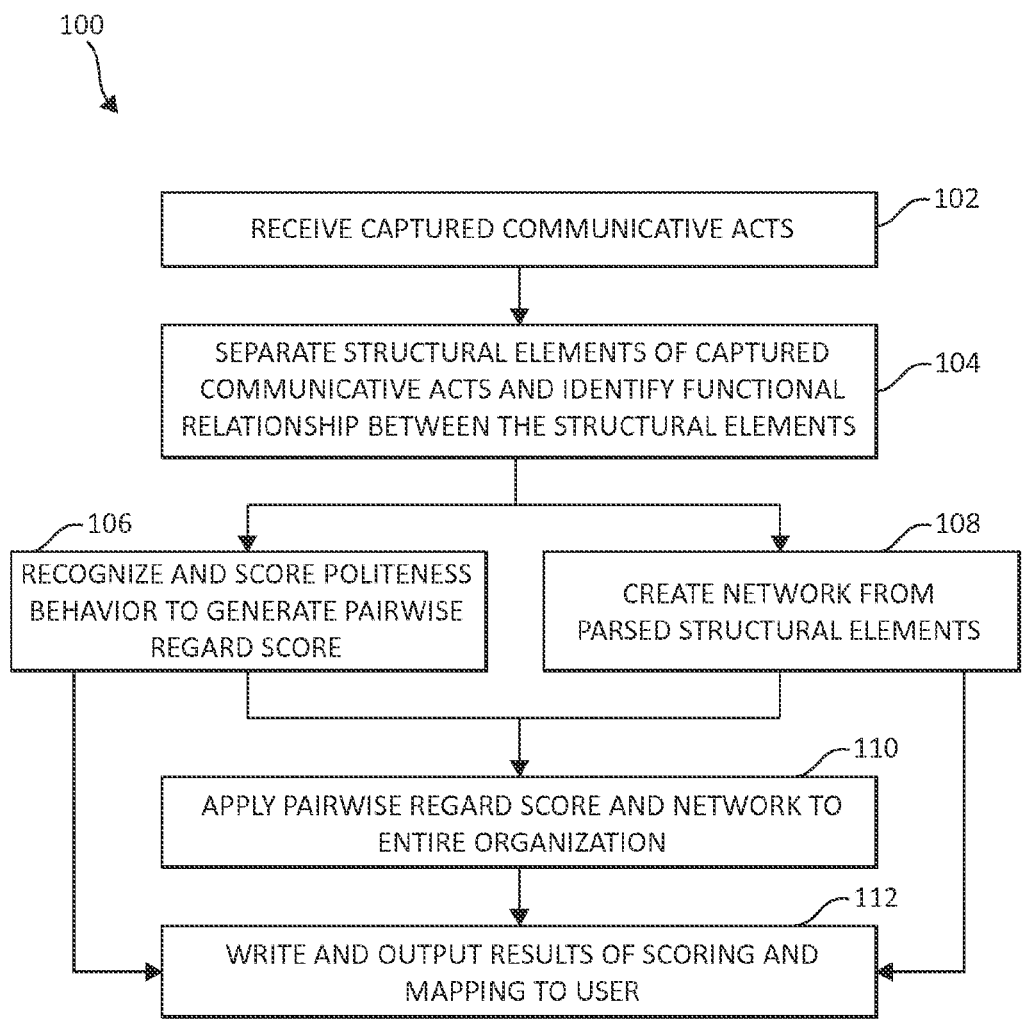
FIG. 8 is a flow chart illustrating a method for receiving and evaluating communicative acts based on social regard, according to one embodiment of the invention.

One embodiment of a method of using regard evaluation system 50 (see FIG. 4) to receive and evaluate communicative acts 12 based on social regard is generally illustrated in FIG. 8 at 100 and is described with additional reference to FIG. 4. Method 100 includes, receiving captured communicative acts 12 via any suitable method, for example, via one or more of transcriptions of spoken (phone or face-to-face) communications, internet relay chat (IRC), forum communications, emails, social networking tools (e.g., Twitter® and Facebook®), and blogs among other possible sources. At 104, the captured communicative acts 12 are passed to discourse parser 52, and discourse parser 52 separates the structural elements of the captured communicative acts 12 and identifies functional relationships between the structural elements of each communicative act 12.

At 106, etiquette engine 54 reviews the elements of communicative acts, and scores politeness behavior based patterns in general behavior recognition patterns database 72 as modified or otherwise scaled based on the patterns and/or modifications provided by culture specific value database 56a. The result at 106 is a determination and generation of pairwise power or regard scores for each communicative act 12 or group of communicative acts 12 as generally illustrated in FIG. 5 at 76. In one embodiment, the culture specific values are preselected for a particular entity or organization as a whole prior to analysis at 106. The selected culture specific value for a specified culture are used as a module or plug-in to alter or augment the general behavior recognition patterns. In one embodiment, each group of culture specific values stored to one or more databases 56 is based on one or more of a geographic, religious, organizational, or other culture form. In this manner the resulting power or regard scores more accurately reflect and weight the importance of various communicative elements and their respect politeness value, etc. in the environment in which they occur.

At 108, the communications network extractor 58 uses the parsed communicative acts 12 output from discourse parser 52 to analyze patterns in the amount or type of contact between entities in a pairwise manner and to create a working network of entities based on common communicative acts 12, document usage, or other indications in communicative acts linking two entities to one another. At 110, communications network aggregator 60 uses the results from each of operations 106 and 108 to combine the scores and relative analysis into a social regard network depiction or other representation of the overall social regard network.

At 112, output writers 62 receive output from etiquette engine 54, communications network extractor 58, and/or communications network aggregator 60 and arranges information from etiquette engine 54, communications network extractor 58, and/or communications network aggregator 60 into various output formats, e.g., graphs, maps, spreadsheets, and/or charts, illustrating relationships between entities, organizational arrangement, etc. Output writers 62 may deliver such results via a suitable user interface and/or printed arrangement. Other variations in method 100 will be apparent to those of skill in the art upon reading the present application.

Figure 11:
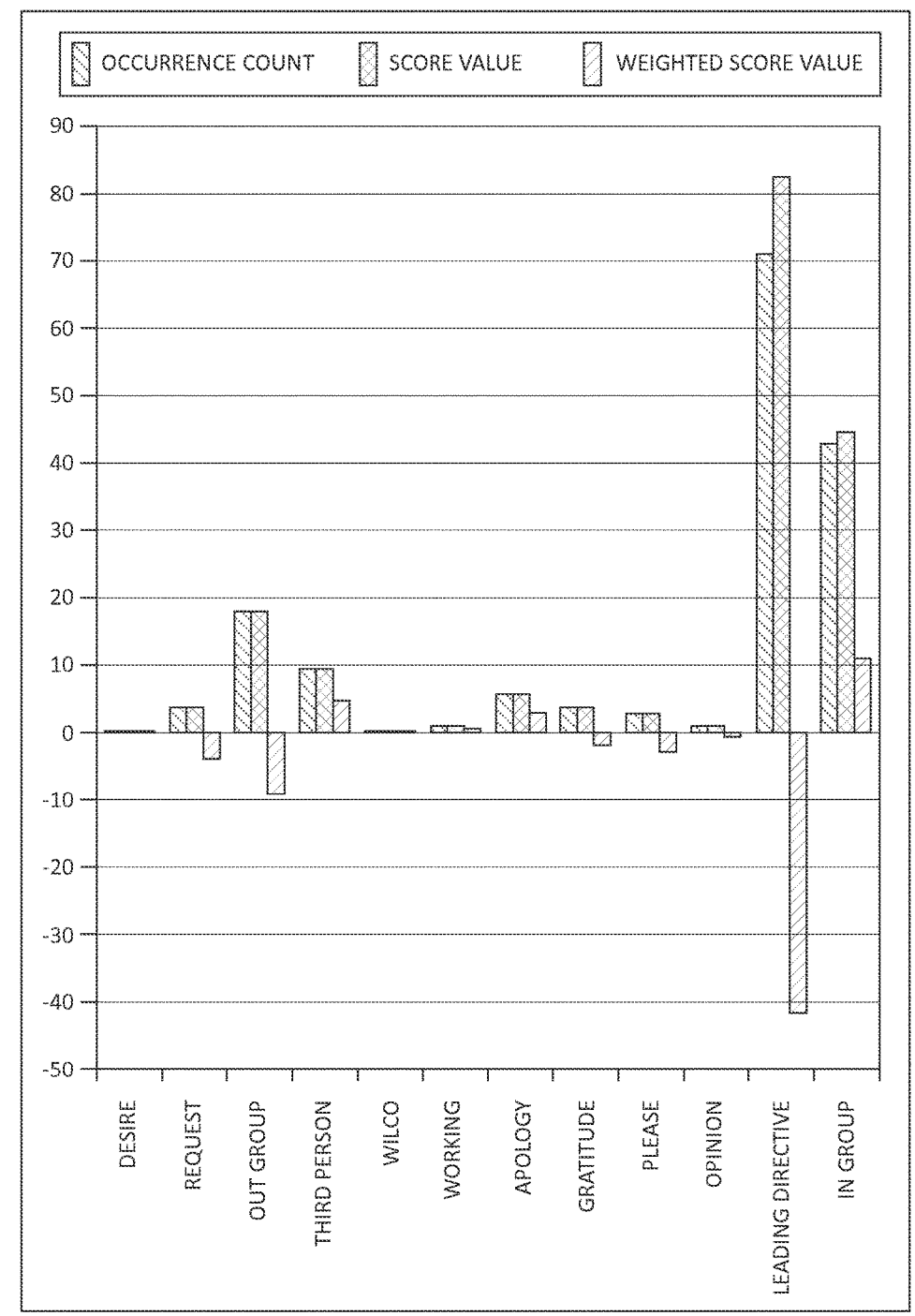
FIG. 11 is a graphical output showing the occurrence count, score value, and weighted score value for a number of redressive elements analyzed over a plurality of communicative acts, according to one embodiment of the present invention.

FIG. 11 illustrates another example of a resulting user interface or printed arrangement from output writers 62 in the form of a bar chart 190. Bar chart 190 provides a graphical look at the overall occurrence counts, score value, and weighted score values seen over a particular set of communicative acts 12. Reviewing bar chart 190 and similar outputs allows one to see what redressive strategies are used for a group. For example, as shown in bar chart 190, three of twelve redressive strategies account for almost 85% of redressive strategy occurrences. Reviewing actual usage and redress score impacts seen for particular redressive strategies provides feedback regarding the scores, weights, identifications used in a system and, in one embodiment, are used to refine scoring patterns, etc. for the same and/or other cultures during future analysis of communications. Other forms of output from output writers 62 will be apparent to those of skill in the art upon reading the current application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, infrared, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made through an external computer (for example, through the Internet using an Internet Service Provider).

The flowchart and block diagram in the above figures illustrate the architecture, functionality, and operation of possible implementations of systems, methods and computer program products according to various embodiments of the present invention. In this regard, each block in the flowcharts and block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention has been described with respect to particular embodiments, such embodiments are for illustrative purposes only and should not be considered to limit the invention. Various alternatives and changes will be apparent to those of ordinary skill in the art upon reading this application.

What is claimed is:

1. A system for evaluating communicative acts to determine a social network perception representation based on communicative acts between a plurality of communicative pairs, each of the plurality of communicative pairs including a first group and one of an individual and a second group participating in a corresponding one or more of the communicative acts, the system comprising:
   a patterns database storing behavior recognition patterns defining particular behaviors that may be used in the communicative acts and a social perception score associated with each one of the particular behaviors;
   a scoring processor in communication with the patterns database and configured to determine a different pairwise social perception score for each of the plurality of communicative pairs based on ones of the particular behaviors identified in the communicative acts taking place between the first group and the one of the individual and the second group of a corresponding one of the plurality of communicative pairs, wherein:
   the scoring processor is configured to determine the different pairwise social perception score for each one of the plurality of communicative pairs based on ones of the particular behaviors identified in the communicative acts between the first group and the one of the individual and the second group of the corresponding one of the plurality of communicative pairs; and
   a communications network aggregation processor configured to combine the pairwise social perception scores for each one of the plurality of communicative pairs, received from the scoring processor, into a social perception network representation, which indicates a respective social perception level of each of the first group and the one of the individual and the second group of each of the plurality of communication pairs relative to other ones of the first group and the one of the individual and the second group of other ones of the plurality of communicative pairs.

2. The system of claim 1, further comprising a communications network extractor configured to determine a network based on linking indications of the communicative acts.

3. The system of claim 2, wherein the communications network aggregation processor is configured to use the network based on the linking indications from the communications network extractor to inform creation of the social perception network representation.

4. The system of claim 1, further comprising one or more output writers configured to arrange one or more of the pairwise social perception scores for each one of the plurality of communicative pairs and the social perception network representation into a graphical representation thereof to be viewed via one or more of a user interface and a printed document.

5. The system of claim 1, wherein:
   the scoring processor is configured to:
      determine an act perception score for each of the communicative acts based on analysis of individual elements of a respective one of the communicative acts, and
      if multiple act perception scores are determined for one of the plurality of communicative pairs, then combine the multiple act perception scores for the one of the plurality of communicative pairs to determine the pairwise social perception score between the first group and the one of the individual and the second group of the one of the plurality of communicative pairs.

6. The system of claim 5, wherein:
   the scoring processor is further configured to analyze the individual elements of each of the communicative acts to determine the social perception score for each of the individual elements of each one of the communicative acts based on the particular behaviors identified in each one of the communicative acts and the behavior recognition patterns stored in the database, and
   the act perception score is based on a combination of the social perception scores for each of the individual elements of the respective one of the communicative acts.

7. The system of claim 6, further comprising:
   a culture specific value database including a plurality of cultural modules each configured to at least one of augment and alter one or more of the social perception scores associated with one or more of the particular behaviors and the summation of the social perception scores, wherein:

the scoring processor is configured to determine the social perception score for each of the individual elements of each one of the communicative acts based on the particular behaviors identified in each one of the communicative acts, the behavior recognition patterns stored in the database, and a preselected one of the plurality of cultural modules from the culture specific value database.

8. The system of claim 7, wherein the preselected one of the plurality of cultural modules is selected based on an expected cultural environment in which the communicative acts take place.

9. The system of claim 7, further comprising a discourse parser configured to receive the communicative acts and to decompose each of the communicative acts into the individual elements for analysis by the scoring processor.

10. The system of claim 1, wherein the particular behaviors include at least one nonverbal behavior.

11. The system of claim 1, wherein the scoring processor automatically determines the pairwise social perception score for each based on analysis of the communicative acts upon receipt of data representing corresponding ones of the communicative acts.

12. The system of claim 1, wherein each pairwise social perception score is further based on a ranked imposition of each of the communicative acts for the communicative pair.

13. The system of claim 1, wherein each of the particular behaviors is one of an individual act and a combination of acts.

14. A method of constructing a organizational chart, the method comprising:
  gathering data regarding a plurality of captured communicative acts occurring between two parties, the two parties defining a sender and receiver pair, wherein at least one of the two parties is a group;
  using a processor and predefined behavior based patterns stored in at least one database to score each of the plurality of captured communicative acts to determine a plurality of social perception scores for the sender and receiver pair, each one of the plurality of social perception scores representing a perceived social difference between the sender and receiver pair for a respective one of the plurality of captured communicative acts based at least in part on behaviors used during the respective one of the plurality of captured communicative acts; and
  combining the plurality of social perception scores for the captured communicative acts occurring between the sender and receiver pair to construct a combined social perception score for the sender and receiver pair indicating the perceived social difference between the sender and receiver pair based on all of the plurality of captured communicative acts between the sender and receiver pair;
  wherein:
    the sender and receiver pair is one of a plurality of sender and receiver pairs in an organization, and the processor determines a different combined social perception score for each one of the of plurality of sender and receiver pairs, and
    the method further comprises using an aggregating hardware engine to aggregate the different combined social perception scores for each of the plurality of sender and receiver pairs to construct the organizational chart for the organization, the organizational chart for the organization indicating relative social perceptions between all parties in the group that form part of the plurality of sender and receiver pairs.

15. The method of claim 14, wherein:
the predefined behavior based patterns stored in the at least one database include scoring values for a plurality of communication components that may be extracted from each of the plurality of captured communicative acts, and
using the processor and the predefined behavior based patterns to score each of the plurality of captured communicative acts includes:
  breaking each of the plurality of captured communicative acts into identified ones of the plurality of communication components,
  scoring each of the identified ones of the plurality of communication components based on the predefined behavior based patterns, and
  summing scores of each of the identified ones of the plurality of communication components to determine a social perception score for the sender and receiver pair corresponding to each of the plurality of captured communicative acts occurring between the sender and receiver pair.

16. The method of claim 14, wherein using the processor and the predefined behavior patterns stored in the at least one database to score each of the plurality of captured communicative acts includes ranking a level of imposition included in each corresponding one of the plurality of captured communicative acts.

17. The method of claim 14, wherein a hardware engine performs the combining the plurality of social perception scores operation.

18. The method of claim 14, further comprising determining a non-politeness based network based on non-politeness based characteristics of the plurality of captured communicative acts, wherein aggregating the different combined power scores for the plurality of captured communicative acts to construct the organizational chart for the organization is determined with reference to the non-politeness based network.

19. The method of claim 14, wherein:
the predefined behavior based patterns include a general set of behavior scoring patterns and a set of predefined cultural scoring values corresponding to an identified culture of the organization, and
the using the processor and predefined behavior based patterns to determine the social perception score is performed using the general set of behavior scoring patterns as one or more of modified and supplemented by the set of predefined cultural scoring values corresponding to the identified culture of the organization.

20. The method of claim 14, wherein the organization of parties within the organization is not fully known to the processor prior to using the processor and predefined behavior based patterns to score each of the plurality of captured acts and prior to combining the plurality of social perception scores.

21. A computer program product for determining a social perception network, the computer program product comprising a non-transitory computer readable storage medium having computer-readable program code portions stored therein, the computer-readable program code portions comprising:
  a first executable portion for receiving a text based representation for each of a plurality of communicative acts occurring between a communicative pair, wherein the communicative pair includes a first group and one of an individual and a second group; and a second executable portion for determining a pairwise social perception score for the communicative pair, wherein the pairwise social perception score is based on behavior strategies used during the plurality of communicative acts occurring between the first group and the one of the individual and the second group;

wherein:
- the first group and the one of the individual and the second group are each part of an organization including additional groups additional individuals,
- the second executable portion determines a pairwise social perception score for other additional groups and additional individuals in the organization based on communicative acts in addition to the plurality of communicative acts between the first group and the one of the individual and the second group, and
- the computer program product further includes a third executable portion for compiling the pairwise social perception scores for the first group and the one of the individual and the second group, the additional groups, and the additional individuals in the organization to construct the social perception network for the organization indicating relative social perception between all groups and individuals in the organization that participated in the plurality of communicative acts and the communicative acts in addition to the plurality of communicative acts.

22. The computer program product of claim 21, wherein the second executable portion includes:
- a partitioning executable portion for partitioning each of the plurality of communicative acts into a plurality of functional elements,
- a scoring executable portion for scoring each of the plurality of functional elements of each of the plurality of communicative acts based on a predefined social perception score accessed from a memory and corresponding with a type of each respective one of the plurality of functional elements,
- a summing executable portion for summing the predefined social perception scores from each of the plurality of functional elements to determine an overall social perception score for each of the plurality of communicative acts, and
- a score aggregation executable portion for aggregating the overall social perception scores for each of the plurality of communicative acts occurring between the first group and the one of the individual and the second group to determine the pairwise social perception score for the first group and the one of the individual and the second group.

* * * * *